UNITED STATES PATENT OFFICE.

EUGÈNE G. RESSENCOURT, OF ST. LOUIS, MISSOURI, ASSIGNOR TO ELIOT H. CHAMBERLAIN, TRUSTEE, OF ST. LOUIS, MISSOURI.

PEACH EXTRACT AND PROCESS OF MAKING SAME.

1,001,555. Specification of Letters Patent. Patented Aug. 22, 1911.

No Drawing. Application filed October 26, 1910. Serial No. 589,132.

*To all whom it may concern:*

Be it known that I, EUGÈNE G. RESSENCOURT, a citizen of the United States, residing at the city of St. Louis, Missouri, have invented a certain new and useful Peach Extract and Process of Making Same, of which the following is such a full, clear, and exact description as will enable any one skilled in the art to which it appertains to make and use the same.

My invention relates to a process of making peach extract and its object is to produce an extract that will be highly concentrated and will have a flavor and aroma corresponding to the fresh fruit.

In a general way, the process is similar to the process of making fruit extracts described in my application Serial No. 589,131 filed Oct. 26, 1910.

My process consists in first thoroughly crushing a mixture of the fresh fruit and an approximately equal quantity of high grade crystallized sugar and then adding cologne spirit which I have found to be the most suitable solvent of the aromatic substances which I desire to separate from the fruit. I prefer to use sugar in the form of large crystals for the reason that the principal purpose of the sugar is to assist in crushing and separating the parts of the fruit and the crystals as they are being broken up satisfactorily perform this function. The fact that the sugar ultimately dissolves and that its presence really adds to the commercial value of the extract makes it a particularly valuable means for the purpose mentioned. I wish it to be understood, however, that the use of sugar in any form, while desirable is not absolutely essential to the production of a satisfactory extract nor is it essential that the proportion of sugar set forth be used, that amount merely having been found to be preferable. The mixture is allowed to stand a few days and is then subjected to a distilling action by means of which the aromatic substances are separated from the fruit and carried over with the cologne spirit to the condenser. I have found that in beginning the extraction the mixture should be heated very gradually and that a suitable temperature to be maintained during the process of extraction is about 200° Fahr. Care must be taken that none of the fruit is burned since this would impair the quality of the extract, and to prevent this I usually place the crushed fruit in a perforated strainer suspended within the retort or container. This prevents the fruit from coming into contact with the bottom or sides of the vessel. The distilling action should be continued until the volume of the mixture is reduced to about one-half of its original volume. The residue which contains the sugar, the coloring matter of the fruit, and some undistilled spirit, is then strained preferably through a double linen cloth and after cooling is added to the distillate. The result is a highly concentrated peach extract that corresponds to the fruit in color, flavor and aroma. I have found, however, that it adds greatly to the quality of extract as to the delicacy and permanence of its aroma and its exact correspondence with the fruit, to add equal quantities of peach spirit and muscatal wine which is preferably done at the time that the crushed fruit is mixed with the cologne spirit.

I will now give a particular example of the details of my process: First I mix about six gallons of peaches, from which the skin and stones have been removed, with an equal quantity by weight, or about sixty pounds of rock candy which should preferably be broken into coarse pieces. The fruit and the rock candy are then ground in a mortar under strong pressure until all of the rock candy is dissolved. To this mixture I then add one-half the quantity by volume, or about six gallons of cologne spirit and one-fourth the quantity by volume, or about three gallons of pure peach spirit and a like amount of muscatel wine. This mixture should then be placed in a glass container having a glass stopper and allowed to remain for several days. It is then subjected to a distilling action and distillation carried on at a temperature of about 200° Fahr. until the volume of the mixture has been reduced about one-half. The residue is then strained and mixed with the distillate.

In order to give the extract a more perfect characteristic color of the fruit I cut the skins of the peaches into small pieces and mash them up with an equal quantity of rock candy and then add twice the quantity by volume of cologne spirit. This mixture is kept for about two weeks, being occasionally shaken, and is then strained and the liquid is added to the extract.

Having fully described my invention, what

I claim as new and desire to secure by Letters Patent of the United States, is:

1. The process of making peach extract which comprises mixing the fruit with cologne spirit, muscatel wine and peach spirit, and subjecting the mixture to distilling action substantially as described.

2. The process of making peach extract which comprises crushing a mixture of sugar and the whole fruit, adding cologne spirit, muscatel wine and peach spirit, and subjecting the mixture to distilling action substantially as described.

3. The process of making peach extract which comprises crushing a mixture of sugar and the whole fruit, adding cologne spirit, muscatel wine and peach spirit, and subjecting the mixture to distilling action at a temperature of about 200° Fahr. until the volume is reduced about one half, straining the residue and adding it to the distillate, substantially as described.

4. The process of making peach extract which comprises crushing a mixture of sugar and the whole fruit, adding cologne spirit, muscatel wine and peach spirit, and subjecting the mixture to distilling action at a temperature of about 200° Fahr. until the volume is reduced about one half, straining the residue and adding it to the distillate together with the liquid resulting from crushing the peach skins and treating them with cologne spirit in the manner specified.

5. The process of making peach extract which comprises mixing the fruit with a solvent of aromatic substances, muscatel wine and peach spirit, and subjecting the mixture to distilling action.

6. The herein described product comprising the distillate of a mixture of peaches with cologne spirit, peach spirit and muscatel wine.

7. Peach extract comprising the distillate of a mixture of peaches with cologne spirit, peach spirit and muscatel wine and the liquid portion of the undistilled residue.

8. Peach extract comprising coloring matter derived from peach skins, a distillate of a mixture of peaches with cologne spirit, peach spirit and muscatel wine and the liquid portion of the undistilled residue.

In testimony whereof, I have hereunto set my hand and affixed my seal in the presence of the two subscribing witnesses.

EUGÈNE G. RESSENCOURT. [L. S.]

Witnesses:
E. E. HUFFMAN,
ELIZABETH BAILEY.

Copies of this patent may be obtained for five cents each, by addressing the "Commissioner of Patents, Washington, D. C."